US008848753B2

United States Patent
Koenning

(10) Patent No.: US 8,848,753 B2
(45) Date of Patent: Sep. 30, 2014

(54) SPATIALLY COMBINED LASER ASSEMBLY AND METHOD OF COMBINING LASER BEAMS

(75) Inventor: Tobias Koenning, Tucson, AZ (US)

(73) Assignee: Dilas Diode Laser Inc., Tucson, AZ (US)

( * ) Notice: Subject to any disclaimer, the term of this patent is extended or adjusted under 35 U.S.C. 154(b) by 0 days.

(21) Appl. No.: 13/977,769

(22) PCT Filed: Jan. 20, 2012

(86) PCT No.: PCT/US2012/021970
§ 371 (c)(1),
(2), (4) Date: Aug. 19, 2013

(87) PCT Pub. No.: WO2012/100124
PCT Pub. Date: Jul. 26, 2012

(65) Prior Publication Data
US 2013/0329758 A1  Dec. 12, 2013

Related U.S. Application Data

(60) Provisional application No. 61/434,574, filed on Jan. 20, 2011.

(51) Int. Cl.
H01S 3/13 (2006.01)
G02B 19/00 (2006.01)
(52) U.S. Cl.
CPC ........ *G02B 19/0019* (2013.01); *G02B 19/0057* (2013.01)
USPC .................. 372/29.021; 372/29.023; 372/26; 372/20; 372/36; 372/34
(58) Field of Classification Search
USPC ................ 372/29.021, 29.023, 26, 20, 36, 34
See application file for complete search history.

(56) References Cited

U.S. PATENT DOCUMENTS

| | | | |
|---|---|---|---|
| 4,466,739 A | 8/1984 | Kasner et al. | |
| 5,040,187 A * | 8/1991 | Karpinski | .................. 372/50.12 |
| 6,108,355 A | 8/2000 | Zorabedian | |
| 2002/0085594 A1 | 7/2002 | Pezeshki et al. | |
| 2004/0165640 A1 * | 8/2004 | Clifford et al. | .................. 372/97 |
| 2004/0252743 A1 * | 12/2004 | Anikitchev et al. | ............. 372/97 |
| 2006/0176563 A1 * | 8/2006 | Xiao | .............................. 359/618 |
| 2007/0195833 A1 | 8/2007 | Nebendahl et al. | |
| 2010/0158060 A1 * | 6/2010 | Faybishenko | .................. 372/36 |

* cited by examiner

*Primary Examiner* — Kinam Park
(74) *Attorney, Agent, or Firm* — Dickinson Wright PLLC

(57) ABSTRACT

A diode laser assembly including a plurality of diode bars disposed on a generally flat base plate and being oriented to emit a plurality of laser beams in a first direction. A reflector is spaced in the first direction from each of the diode bars in the first. Each reflector has at least two reflecting surfaces, one for reflecting the laser beams into a second direction different from the first direction and the other for reflecting the laser beams into a third direction different from the first and second directions to produce a spatially combined laser beam. Each reflector is moveable relative to one another and to the diode bars for adjusting the individual laser beams within the spatially-combined laser beam for optimizing the quality of the spatially combined laser beam.

15 Claims, 3 Drawing Sheets

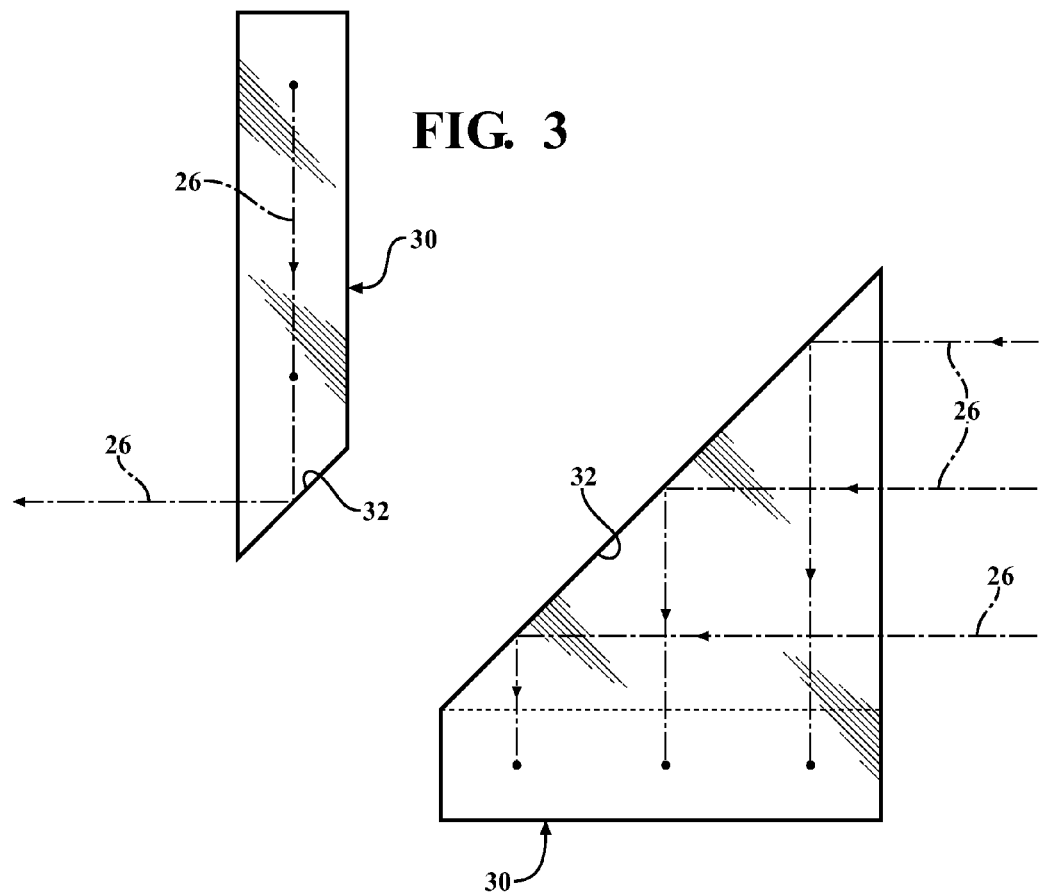
FIG. 3
FIG. 4
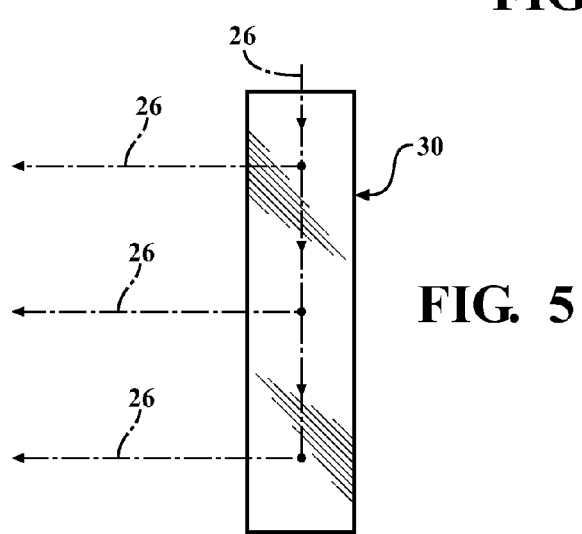
FIG. 5

SPATIALLY COMBINED LASER ASSEMBLY AND METHOD OF COMBINING LASER BEAMS

CROSS-REFERENCE TO RELATED APPLICATIONS

This U.S. National Stage Patent Application claims the benefit of International Patent Application Serial No. PCT/US2012/021970 filed on Jan. 20, 2012, entitled "Spatially Combined Laser Assembly And Method Of Combining Laser Beams," and U.S. Provisional Application No. 61/434,574 filed Jan. 20, 2011, the entire disclosures of these applications being considered part of the disclosure of this application and hereby incorporated by reference.

BACKGROUND OF THE INVENTION

1. Field of the Invention

The present invention relates to lasers. More specifically, the present invention relates to an assembly for combining the beams of a plurality of diode lasers into a spatially combined laser beam.

2. Brief Description of the Prior Art

Diode lasers, otherwise known as semiconductor lasers, are well known laser light sources for producing laser beams with a high brightness and a high beam quality. Because of these properties, diode lasers are used in many everyday applications including, for example, CD players, DVD players, laser printers, and bar-code readers.

As will be understood by those having skill in the art, a diode laser emitter generally includes a crystal structure having an n-type region, which is negatively charged, and a p-type region having a plurality of holes. The n-type and p-type regions are joined to one another in a p-n junction zone. When a charge is applied across the opposing n and p-type regions, the electrons of the n-type region combine with the holes of the p-type region in the p-n junction zone and photons, or light, is released. The photons are then channeled by the emitter to produce a laser beam.

Although diode laser emitters are very efficient at producing laser beams, the quality of the laser beam produced decreases when the power applied to the diode laser emitter is increased. Therefore, high powered laser applications—such as medical applications, material processing applications and defense applications—often require many diode laser emitters working in combination to produce a combined and more powerful laser beam with a high beam quality. These combined diode laser emitters are preferably arranged in what is commonly referred to as a diode bar, each of which typically includes anywhere from nine to fifty individual diode laser emitters arranged in a one-dimensional array.

One problem with diode bars is that they produce heat which must be conveyed away from the diode laser emitters for them to continue operating properly. To dispense this heat, diode bars are typically mounted on a base plate which functions as either a conventional convection cooled heat sink or a liquid cooled heat sink.

Another problem with diode bars is that a single diode bar is still not powerful enough for some applications. One approach to producing a high powered and spatially combined laser beam is through a vertical stack assembly. In a typical vertical stack assembly, a plurality of diode bars and heat sinks are alternately stacked one on top of another in a vertical direction. While this approach may be suitable for liquid cooled heat sinks, it is generally not suitable for convection cooled heat sinks due to a lack of surface area for dispensing heat to the air. Additionally, the stacking pitch, or the distance between the laser beams of adjacent diode bars, is dictated by the width of the heat sinks and cannot be adjusted. Large heat sinks will result in a spatially combined laser beam with a large stacking pitch, a large beam parameter product (BPP) and a low beam quality, whereas small heat sinks may improve upon these properties of the spatially combined laser beam but do not provide adequate cooling to the diode bars.

Another approach to producing a high powered and spatially combined laser beam is known as the step-and-mirror approach. A step-and-mirror assembly includes a base plate having a plurality of mounting surfaces for supporting a plurality of diode bars. The mounting surfaces are disposed at different vertical heights, and therefore, the diode bars are spaced from one another in a shelf-like manner. The diode bars are each oriented to emit laser beams in a lateral direction. A reflector (preferably a minor) is aligned with each of the diode bars for redirecting the laser beams at a 90 degree angle into a longitudinal direction, and the reflectors are laterally aligned with one another so that the laser beams from the diode bars are vertically stacked on top of one another after the redirection.

Each reflector may be rotated on two axes to adjust the far field pointing of the laser beams in the lateral and vertical directions. Additionally, the reflectors may be translated in the lateral direction to adjust the position of the re-directed beam in the lateral direction. Thus, each reflector provides three degrees of freedom for adjusting the position and far field pointing of the associated laser beam in the spatially combined laser beam.

In a step-and-mirror assembly, the vertical spacing of the steps determines the pitch of the combined laser beam, and if the steps are not spaced vertically from one another by a sufficient distance, the reflected laser beams will clip the reflectors for the other diode bars. Therefore, due to inherent tolerances in the manufacturing of the stepped base plate and the inability of the step-and-minor assembly to adjust the vertical position of the laser beams, the steps in the base plate are generally spaced vertically by a larger distance than would otherwise be ideal. Consequently, the resulting laser beam from the step-and-mirror assembly has an increased stacking pitch, increased BPP and a decreased beam quality.

The step-and-minor assembly approach to combining laser beams has additional shortcomings other than those discussed above. For example, they typically are machined into the base plate, resulting in increased manufacturing costs and an increased surface roughness, which could reduce the thermal conductivity between the diode bars and the base plate. Additionally, the thermal resistance may vary between the different diode bars due to the different material thicknesses of the base plate at the mounting surfaces. This may result in a broader spectrum of the combined beam due to a varying drift in the center wavelength between the diode bars depending on the position of each bar on the stepped base plate. Moreover, once machined, the steps cannot be adjusted to change the pitch of the combined laser beam. Finally, if coolant is used to cool the base plate, a complex and difficult to form coolant channel may be required to convey the coolant through the steps to provide adequate cooling to the diode bars.

There remains a significant and continuing need for an assembly for producing a spatially combined laser beam from a plurality of diode laser emitters with an adjustable pitch to maximize both the power and quality of the spatially combined laser beam. Further, there is a need for an assembly for producing a combined laser beam that has the same thermal resistance between each of the diode laser emitters and the base plate and can be either liquid or convectively cooled.

SUMMARY OF THE INVENTION

One aspect of the present invention provides for a diode laser assembly which produces a spatially combined laser beam having an adjustable pitch and having a generally uniform thermal resistance for each of a plurality of diode bars. The assembly includes a generally flat base plate supporting a plurality of diode bars which are planar with one another. A reflector, such as a prism, is aligned with each of the diode bars for twice re-directing the associated laser beam. Specifically, each reflector includes two reflecting surfaces such that the laser beam is re-directed from a first direction into a second direction by the first reflecting surface and then into a third direction by the second reflecting surface. Each reflector may be rotated in two directions to adjust the far field pointing of the laser beams or translated in two directions to adjust the position of the re-directed laser beams within the spatially combined laser beam. Thus, each reflector provides four degrees of freedom for adjusting the position and far field pointing of the associated laser beam. The spacing of the reflectors relative to one another in the first direction determines the pitch of the spatially combined laser beam, and as such, the properties (e.g. the stacking pitch, beam parameter product (BPP) and beam quality) of the spatially combined laser beam can be quickly and easily adjusted by adjusting the reflectors.

The assembly is advantageous for a number of reasons. For example, the laser beams can be actively aligned with the diode bars in operation to minimize the stacking pitch, minimize the BPP and maximize the beam quality. Additionally, the flat base plate may be lighter, less costly, smoother and more precisely dimensioned than a comparable machined base plate. Further, the uniform thickness of the base plate ensures that there will be very little or no differences in the thermal resistance of the diode bars, and therefore, the laser beams will have similar center wavelengths. Finally, if water, or any other liquid, is used to cool the base plate, a simple and easy to produce channel without any steps or complex features may be formed into the base plate to convey that liquid.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a side view of the prism of the exemplary embodiment re-directing a plurality of laser beams;

FIG. 4 is a front view of the prism of the exemplary embodiment re-directing a plurality of laser beams;

FIG. 5 is a top view of the prism of the exemplary embodiment re-directing a plurality of laser beams.

DETAILED DESCRIPTION OF THE PREFERRED EMBODIMENT

Figure 1:
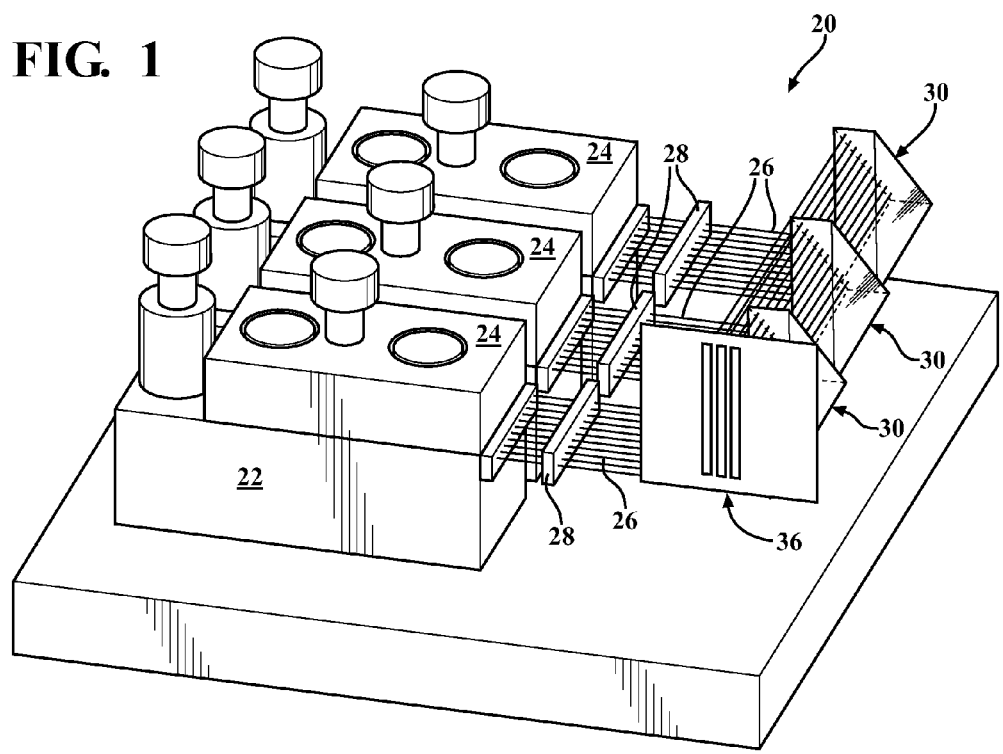
FIG. 1 is a perspective view of the exemplary embodiment of the diode laser assembly.

Referring to the Figures, wherein like numerals indicate corresponding parts throughout the several views, a diode laser assembly 20 constructed according to one aspect of the present invention is generally shown in FIG. 1. The diode laser assembly 20 includes a generally flat base plate 22 having a plurality of mounting surfaces for supporting a plurality of diode bars 24, each of which includes a plurality of diode laser emitters arranged in a one-dimensional array. Alternately, the diode laser emitters could be mounted on the base plate 22 without the diode bars 24, if desired. As shown, all of the diode bars 24 are disposed in the same vertical plane, and each is oriented to emit a laser beam 26 in a first, or lateral, direction.

In addition to supporting the diode bars 24, the flat base plate 22 functions as a heat sink, which can be liquid or convectively cooled, to convey heat away from the diode bars 24. The base plate 22 is of one piece of material and has a generally uniform thickness to ensure that the thermal conductivity between the diode bars 24 and the base plate 22 is generally the same for each diode bar 24, and thus, all of the diode bars 24 will emit light having approximately the same center wavelength because the center wavelength of light emitted by diode bars 24 is at least partially dependent on the thermal conductivity between the diode bars 24 and the base plate 22.

As will be appreciated by those having skill in the art, diode lasers are notorious for having a large divergence in the direction of the fast-axis, or in the vertical direction of the exemplary embodiment. Therefore, a fast-axis collimated lens 28 is aligned with each of the diode bars 24 for collimating or aligning the laser beams 26 from the diode bars 24.

Figure 2:
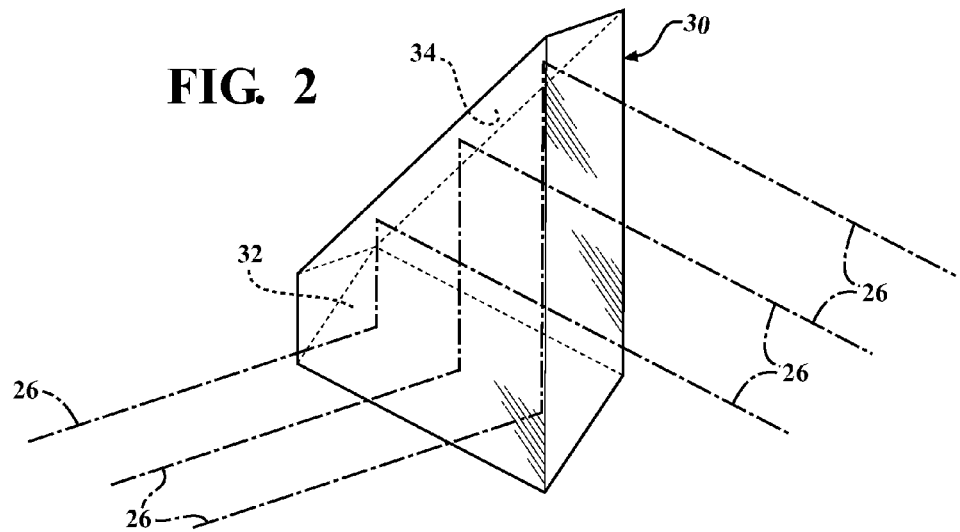
FIG. 2 is a perspective view of a prism of the exemplary embodiment re-directing a plurality of laser beams.
Figure 6:
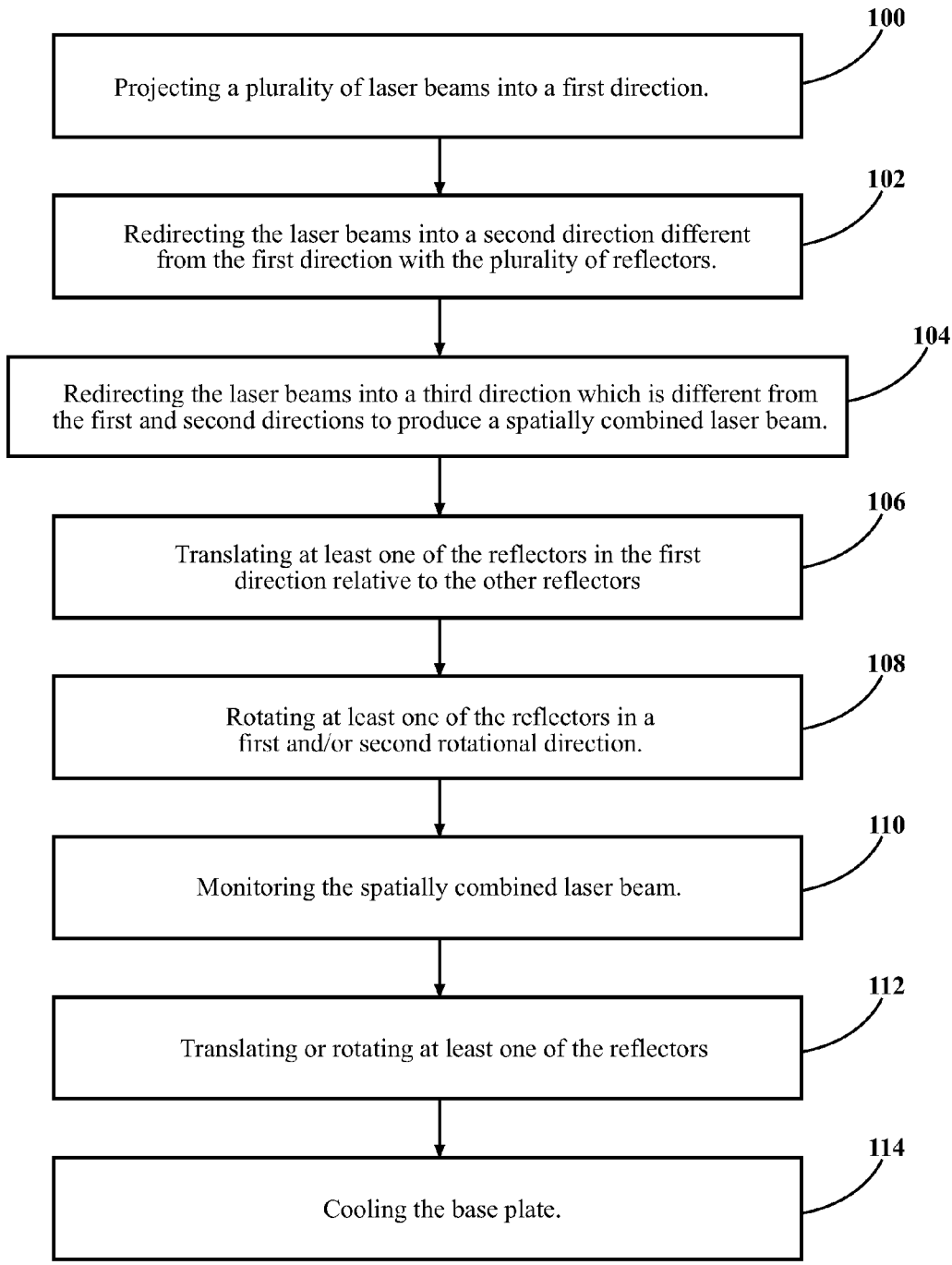
FIG. 6 is a flow chart of an exemplary method of combining a plurality of individual laser beams into a spatially combined laser beam.

As will be discussed in further detail below, a reflector 30, generally indicated, is aligned with each of the diode bars 24 in the lateral direction for twice re-directing the laser beams 26 emitted therefrom. As shown in FIG. 2, in the exemplary embodiment, the reflector 30 is a prism having a first reflecting surface 32 and a second reflecting surface 34, but any other type of reflector 30 could alternatively be used. For example, the reflector 30 could be a pair of mirrors.

In operation, each laser beam 26 emitted from one of the diode bars 24 in the lateral direction is re-directed first by approximately ninety-degrees (90°) into a vertical direction by a first reflecting surface 32 of the aligned reflector 30 and then by ninety-degrees (90°) into a longitudinal direction by a second reflecting surface 34 of the aligned reflector 30. Referring now to FIG. 3, the laser beams 26 are shown being re-directed from the lateral direction into the vertical direction. FIG. 4 shows the laser beams 26 being re-directed from the vertical direction into the longitudinal direction. The reflectors 30 are spaced laterally from one another, and therefore, the twice re-directed laser beams 26 are stacked adjacent to one another in the lateral direction to produce a spatially combined laser beam 36, which is best shown in FIG. 1.

The stacking pitch, beam parameter product (BPP) and beam quality of the spatially combined laser beam 36 can all be quickly and easily adjusted by rotating and/or translating the reflectors 30. Specifically, each reflector 30 can be rotated in two different directions to adjust the far field pointing direction of the associated laser beam 26 within the spatially combined laser beam 36 or each reflector 30 can be translated in two different directions to adjust the vertical and lateral positions of the laser beam 26 within the spatially combined laser beam 36. For example, when one of the reflectors 30 is translated in the lateral direction, the lateral position of corresponding re-directed laser beam 26 will be moved by the same distance. Such movement of the lateral position of the laser beam 26 will affect the gap between adjacent laser beams 26, and thus, the pitch of the spatially combined laser beam 36. Likewise, when one of the reflectors 30 is translated in the longitudinal direction, the corresponding re-directed laser beam 26 will be moved in the vertical direction. Moreover, each reflector 30 can be rotated in a first rotational direction to adjust the associated laser beam's 26 far field pointing in the vertical direction or it can be rotated in a second rotational direction to adjust the associated laser beam's 26 far field pointing in the lateral direction. Therefore, each reflector 30 has four degrees of freedom to control the position and pointing of the associated laser beam 26. Preferably, the reflectors 30 are all in electrical communication with a computer (not shown) or any other controller which controls the rotation and translation of the reflectors 30, but the reflectors 30 could also be adjusted manually.

Adjustments to the reflectors 30 can be made with the diode bars 24 in operation, and therefore, the laser beams 26 can be actively aligned with one another. One way to actively align the laser beams 26 is to point the spatially combined laser beam 36 at a power meter or a beam profiler and adjust the positions and orientations of the reflectors 30 until the power and quality of the spatially combined laser beam 26 are both maximized.

Referring now to the flow chart in FIG. 8 and to the diode laser assembly 20 of FIG. 1, another aspect of the subject invention provides for a method of combining a plurality of individual laser beams 26 into a spatially combined laser beam 36. The method starts with the step 100 of projecting a plurality of laser beams 26 into a first direction. As discussed above, each of the laser beams 26 is preferably produced by a diode bar 24 containing a plurality of diode laser elements; however, it should be appreciated that other types of lasers could alternately be employed.

The method continues with the step 102 of redirecting the laser beams 26 into a second direction different from the first direction with a plurality of reflectors 30. The method then proceeds with the step 104 of re-directing the laser beams 26 into a third direction which is different from the first and second direction to produce a spatially combined laser beam 36. Preferably, each reflector 30 is a prism with at least two reflecting surfaces 32, 34, and each reflector 30 is aligned with one of the diode bars 24. The second direction is preferably angled by approximately ninety-degrees (90°) relative to the first direction, and the third direction is preferably angled by approximately ninety-degrees (90°) relative to the second direction.

The method then continues with the step 106 of translating at least one of the reflectors 30 in the first direction relative to the other reflectors 30 to adjust the pitch of the spatially combined laser beam 36. The method may also include the step 108 of translating at least one of the reflectors 30 in another direction to adjust the vertical position of the associated laser beam 26 after the second re-direction. Thus, through the simple movement of the reflectors 30, the positions of the individual laser beams 26 within the spatially combined laser beam 36 can be adjusted. This alignment can be done actively, i.e. with the laser emitters in operation.

The method may also include the step 110 of rotating at least one of the reflectors in a first and/or a second rotational direction to adjust the far-field pointing of the associated laser beam 26. Thus, through the simple rotation of the reflectors 30, the far-field pointing of the laser beams can be adjusted.

The method may also include a calibration process with the laser emitters in operation to optimize the stacking pitch, the BPP and the beam quality of the spatially combined laser beam 36. The calibration process includes the steps 112, 114 of monitoring the spatially combined laser beam 36 with a power meter and/or beam profiler (not shown) and translating and/or rotating the reflectors 30.

The diode bars 24 are preferably mounted on a single, generally flat base plate 22. To keep the diode bars 24 cool, the method may additionally include the step 116 of cooling the base plate 22. As discussed above, the base plate 22 may either be liquid or convectively cooled.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A diode laser assembly comprising:
    a plurality of diode laser emitters disposed on the same plane for emitting a plurality of laser beams in a first direction;
    a plurality of reflectors with each reflector including a first reflecting surface for re-directing at least one of said laser beams into a second direction and a second reflecting surface for re-directing the same laser beam into a third direction;
    said reflectors being spaced from one another in said first direction for producing a spatially combined laser beam; and
    each of said reflectors being independently movable relative to one another and relative to said diode laser emitters in said first direction for adjusting the pitch between any two laser beams.

2. The diode laser assembly as set forth in claim 1 wherein said diode laser emitters are arranged in a plurality of diode bars and wherein each of said reflectors is aligned with at least one of said diode bars.

3. The diode laser assembly as set forth in claim 1 wherein said reflectors are rotatable in at least one direction for adjusting the far field pointing of the associated laser beams in at least one direction.

4. The diode laser assembly as set forth in claim 3 wherein said reflectors are rotatable in two directions for adjusting the far field pointing of the associated laser beams in two directions.

5. The diode laser assembly as set forth in claim 1 wherein said first reflecting surface of each reflector is oriented for re-directing the associated laser beam by approximately ninety-degrees (90°).

6. The diode laser assembly as set forth in claim 5 wherein said second reflecting surface of each reflector is oriented for re-directing the associated laser beam by approximately ninety-degrees (90°).

7. The diode laser assembly as set forth in claim 1 wherein said plurality of diode laser emitters are mounted on a generally flat base plate.

8. The diode laser assembly as set forth in claim 1 wherein each of said reflectors is moveable in a second direction for adjusting the vertical position of the associated laser beam.

9. A method of combining laser beams comprising the steps of:
    projecting a plurality of laser beams into a first direction;
    re-directing the laser beams into a second direction different from the first direction with a plurality of reflectors;
    re-directing each of the laser beams into a third direction different from the first and second directions with the plurality of reflectors to produce a spatially combined laser beam; and
    translating at least one of the reflectors relative to the other reflectors in the first direction to adjust the pitch of the spatially combined laser beam.

10. The method as set forth in claim 9 further including the step of translating at least one of the reflectors relative to the other reflectors in a second direction to adjust the vertical position of the associated laser beam.

11. The method as set forth in claim 9 further including the step of rotating at least one of the reflectors in a first rotational direction relative to the other reflectors to adjust the far-field pointing of the associated laser beam.

12. The method as set forth in claim 11 further including the step of rotating at least one of rotating at least one of the reflectors in a second rotational direction relative to the other reflectors to adjust the far-field pointing of the associated laser beam.

13. The method as set forth in claim 9 wherein the laser beams are projected from a plurality of laser emitters mounted on a generally flat base plate and further including the step of cooling the base plate.

14. The method as set forth in claim 9 wherein the first direction is angled by approximately ninety-degrees (90°) from the second direction and wherein the third direction is angled by approximately ninety-degrees (90°) from the second direction.

15. The method as set forth in claim 9 further including the step of monitoring the spatially combined laser beam with a power meter and further including the step of translating or rotating the reflectors to adjust the power and quality of the spatially combined laser beam.

\* \* \* \* \*